(12) United States Patent
Cao et al.

(10) Patent No.: US 10,088,838 B2
(45) Date of Patent: Oct. 2, 2018

(54) METHOD FOR DIAGNOSTIC MONITORING OF A WIND TURBINE GENERATOR SYSTEM

(75) Inventors: Shu Yu Cao, Singapore (SG); Bing Li, Singapore (SG); Anshuman Tripathi, Singapore (SG); Hock Heng Thia, Singapore (SG); Rasool Beevi D-O Mohamed Arif, Singapore (SG); Kheng Hong Ang, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 930 days.

(21) Appl. No.: 13/980,524

(22) PCT Filed: Jan. 17, 2012

(86) PCT No.: PCT/DK2012/050017
§ 371 (c)(1),
(2), (4) Date: Jan. 13, 2014

(87) PCT Pub. No.: WO2012/097819
PCT Pub. Date: Jul. 26, 2012

(65) Prior Publication Data
US 2014/0122011 A1    May 1, 2014

Related U.S. Application Data

(60) Provisional application No. 61/435,953, filed on Jan. 25, 2011.

(30) Foreign Application Priority Data

Jan. 20, 2011   (DK) .................................. 2011 70031

(51) Int. Cl.
G05B 23/02    (2006.01)
F03D 17/00    (2016.01)
F03D 80/50    (2016.01)

(52) U.S. Cl.
CPC ......... *G05B 23/0221* (2013.01); *F03D 17/00* (2016.05); *F03D 80/50* (2016.05);
(Continued)

(58) Field of Classification Search
CPC . G05B 23/0221; G05B 23/0235; F03D 17/00; F03D 80/50; F05B 2260/80; Y02E 10/72
(Continued)

(56) References Cited

U.S. PATENT DOCUMENTS

2007/0140847 A1   6/2007   Martinez De Lizarduy Romo et al.
2010/0268393 A1   10/2010  Fischle et al.
(Continued)

FOREIGN PATENT DOCUMENTS

| EP | 1022838 A2 | 7/2000 |
|----|------------|--------|
| EP | 1612458 A2 | 1/2006 |
| WO | 2009016020 A1 | 2/2009 |
| WO | 2010/039153 A1 | 4/2010 |

OTHER PUBLICATIONS

Al-Ahmar et al., Wind Energy Conversion Systems Fault Diagnosis Using Discrete Wavelet Analysis, International Review of Electrical Engineering, 2008, 3 (4), pp. 646-652.*
(Continued)

*Primary Examiner* — Huan Tran
*Assistant Examiner* — Alexander D Shenderov
(74) *Attorney, Agent, or Firm* — Patterson + Sheridan, LLP (57) ABSTRACT

A method for diagnostic monitoring of a wind turbine generator system, said wind turbine generator system comprising a generator, a drive train, and a number of sensors for providing signals and a control system. The method comprising the selection of three sets of signals from said sensors. From the three sets of signals three conditioned sets of signals are obtained by high pass filtering said first set of
(Continued)

signals, low pass filtering the second set of signals, and forming a moving average value on the third set of signals. Based on each of said first, second and third set of conditioned signals an evaluation is performed in order to determine a fault, where said evaluation comprises comparing the first, second and third set of conditioned signals with reference values. If said comparison indicates a fault an alarm is set.

20 Claims, 7 Drawing Sheets

(52) U.S. Cl.
CPC ...... *G05B 23/0235* (2013.01); *F05B 2260/80* (2013.01); *Y02E 10/72* (2013.01)

(58) Field of Classification Search
USPC ........................................................ 702/108
See application file for complete search history.

(56) References Cited

U.S. PATENT DOCUMENTS

| | | |
|---|---|---|
| 2010/0277137 A1 | 11/2010 | Zhao et al. |
| 2010/0327585 A1* | 12/2010 | Cao ....................... F03D 7/0272 290/44 |
| 2011/0006528 A1 | 1/2011 | Engelhardt et al. |
| 2015/0292484 A1* | 10/2015 | Haj-Maharsi ............. F03D 9/10 290/44 |

OTHER PUBLICATIONS

Danish Search Report, PA 2011 70031, dated Sep. 9, 2011.
International Search Report, PCT/DK2012/050017, dated Jun. 1, 2012.
Ciang, et al: "Structural health monitoring for a wind turbine system: a review of damage detection methods", Measurement Science and Technology, IOP, Bristol GB, vol. 19, No. 12, Dec. 1, 2008 (Dec. 1, 2008), pp. 1-20, XP002616703, ISSN: 0957-0233, DOI: 10.1088/0957-0233/19/12/122001, the whole document.

* cited by examiner

METHOD FOR DIAGNOSTIC MONITORING OF A WIND TURBINE GENERATOR SYSTEM

The present invention relates to method for diagnostic monitoring of a wind turbine generator system.

A wind turbine generator system typically comprises a generator, a drive train between a rotor and the generator and a number of sensors form providing monitoring signals used inter alia to control the wind turbine generator.

Like all other systems wind turbine generators occasionally experience defects and failure of various parts, some failures are minor and allow the wind turbine generator system to continue operating. Such minor failures may therefore go undetected over time and grow until they cause a major failure causing unscheduled shutdown of the wind turbine generator system.

According to a statistic study of wind industry, 14.1% of failure in wind turbine generator systems is caused by sensor failure, 12.9% of failure is caused by control system failure, 5.5% of failure is caused by generator fault, and 9.8% of failure is caused by gear box failure. If just some of these failures can be predicted before the condition becomes worse and finally leads to serious electrical and mechanical system failure and turbine shutdown much would be saved.

Testing of electrical machines per se is not new. As an example WO-A-2010/039153 discloses a portable system for multiphase motive force electrical machine testing. WO-A-2010/039153, however, does not deal with the mechanical drive train between the rotor and the generator.

Based on this, it is the object of the present invention to provide an improved method for monitoring a wind turbine generator system in order to detect faults at an early stage, allowing these to be repaired before unscheduled turbine shutdown, e.g. at scheduled maintenance.

According to a first aspect of the invention, this object is achieved by a method for diagnostic monitoring of a wind turbine generator system, said wind turbine generator system comprising a generator, a drive train, a plurality of sensors for providing signals and a generator control system, said method comprising: receiving a set of signals from said sensors, the set of signals selected from any one of: a set of signals comprising high frequency components, a set of signals comprising low frequency components, and a set of signals comprising electrical characteristics of a stator in the generator; evaluating the set of signals, where said evaluation comprises comparing the set of signals with reference values in order to determine a fault and the location of the fault.

This selection of signals already used by the control system allow continuous monitoring by the control system of the wind turbine generator system for diagnostic purposes. In particular, the selection of the signals allows signals indicative of different faults to be discriminated, so as to e.g. detect and locate faulty detectors, faults in the drive train and faults in the generator. Such detection and location thus allows repairs to be made quickly and efficiently at the next scheduled maintenance, or, if necessary, even re-scheduling of maintenance to an earlier date.

According to a first preferred embodiment of the first aspect of the invention, the set of signals is a set of signals comprising high frequency components, and the method further comprises obtaining a conditioned set of signals by high pass filtering the set of signals and evaluating the conditioned set of signals by comparing the conditioned set of signals with reference values in order to determine a fault and the location of the fault. In particular, the set of signals comprise signals chosen to allow determining a fault in any one of a generator current sensor and a control system supervising high frequency generator operation. The conditioning of the signals by high pass filtering aids in detecting, discriminating and locating faults in the generator current sensor and high frequency bad performance faults of the generator.

According to a further preferred embodiment, the set of signals is a set of signals comprising low frequency components, and the method further comprises obtaining a conditioned set of signals by low pass filtering the set of signals and evaluating the conditioned set of signals by comparing the conditioned set of signals with reference values in order to determine a fault and the location of the fault. In particular, the set of signals comprise signals chosen to allow determining a fault in any one of a drive train operation characteristic and a control system supervising low frequency generator operation. The conditioning of the signals by low pass filtering aids in detecting, discriminating and locating faults in the drive train and low frequency bad performance faults of the generator. According to another preferred embodiment of the first aspect of the invention, the low pass filtered signals are down sampled before evaluation. The down sampling allows the collection and storage of data over a longer time span, in order to detect and keep information about the relatively slow mechanical dynamic performance of the drive train.

According to a further preferred embodiment, the set of signals is a set of signals comprising electrical characteristics of the generator stator, and the method further comprises obtaining a conditioned set of signals by forming a moving average on the set of signals and evaluating the conditioned set of signals by comparing the conditioned set of signals with reference values in order to determine a fault and the location of the fault. This allows detection of parameter changes such as short circuited windings or deterioration of magnet strength. According to yet another preferred embodiment of the first aspect of the invention, the moving average values of the set of signals are down sampled before evaluation. Also in this case the down sampling allows the collection and storage of data over a longer time span.

According to a further preferred embodiment, multiple sets of signals are received from said sensors, each set of signals being evaluated separately in determining a fault. This allows for evaluation in a progressive manner or if sufficient computing power is available evaluation in parallel.

According to a preferred embodiment, the reference values are values derived in commissioning tests and are stored in a look-up table. Tabulating reference values throughout the operating range of the wind turbine generator prior to commissioning allows easy and quick access to the reference value at very little expense in terms of computer calculation power.

According to an alternative preferred embodiment, the method further comprises receiving the reference signals from an emulation of at least a part of the wind turbine generation system. In particular, the emulation is a real-time emulation of the generator control system. If sufficient computer power is available this allows the control system to emulate the wind turbine generator system, in particular in real time, thus avoiding time consuming test runs, e.g. during commissioning of the wind turbine generator system.

According to a further preferred embodiment, the emulation of the generator is carried out with the same operating parameters as the generator. By using the same operating parameters in the emulation, good and useful reference values may obtained.

According to a further preferred embodiment, the evaluation is based on the standard deviation of the set of signals under evaluation with respect to the reference values. Using the standard deviation is an efficient statistical analysis for detecting deviations from a norm.

According to a second aspect of the invention, the object is achieved by the provision of a control system for a wind turbine generator system comprising a data processing means and adapted to execute the method outlined above.

Use of the control system itself is advantageous because it allows efficient implementation of the diagnostic method, benefiting from the fact that all the signals relied on in the diagnostic method are already part of the signals used for the control, and thus readily available. At the same time the diagnostic method may be implemented to run on and utilize the same hardware as the one used for the control, thus reducing the need for additional hardware.

According to a third aspect of the invention, a computer program product for carrying out the method, when said computer program product is run on a data processing means, such as a computer, is provided.

According to a fourth aspect of the invention a data carrier comprising a computer program product for carrying out the method, when said computer program product is run on a data processing means, such as a computer, is provided.

The invention will now be described in greater detail with the use of non-limiting exemplary embodiments and referring to the drawings, on which:

Figure 1:
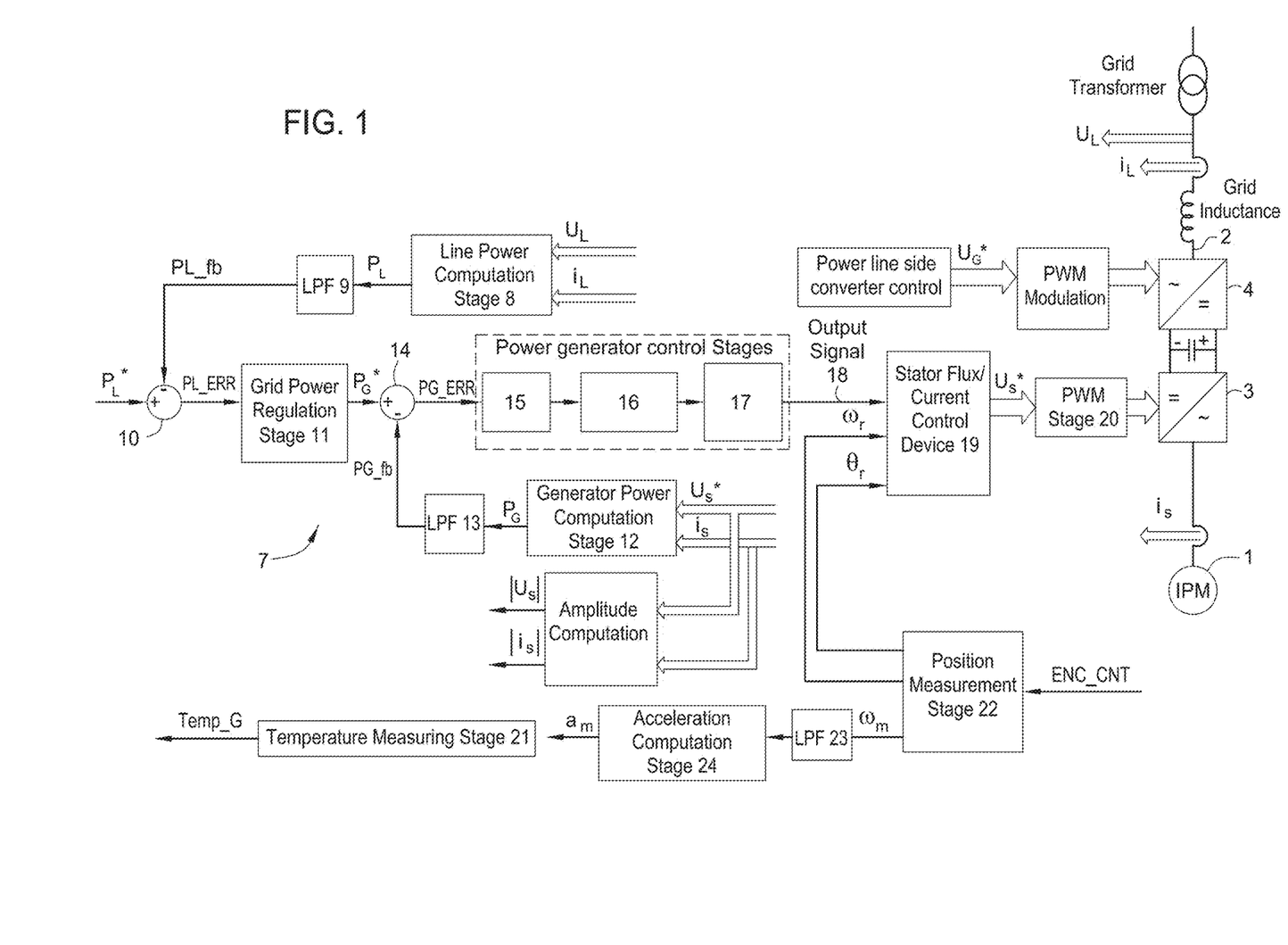
FIG. 1 is a block diagram schematically showing the control system for a wind turbine generator system.

The block diagram of FIG. 1 schematically shows a control system for a wind turbine generator system. The wind turbine generator system comprises a generator 1 supplying power to a power line 2 of an electrical grid via a AC/DC converter 3 and a DC/AC converter 4. The generator is an Internal Permanent Magnet or IPM type. In other embodiments, a surface mounted permanent magnet generator or an induction generator may be present.

The control system receives a reference signal power target value input $P_L^*$. Throughout the following description the asterisk indicates a target or reference value. The control system comprises an outer line power feedback loop 6 and an inner generator power feedback loop 7.

The power line feedback loop 6 receives power line voltage input $U_L$ and power line current input $i_L$, based on which a power line measurement signal $P_L$ is computed by a line power computation stage 8, which, like other stages described below, is preferably implemented in software running on a data processing means such as a computer. The power line measurement signal $P_L$ is filtered in a first low pass filter 9 to form the power line feedback signal PL_fb. The power line feedback signal PL_fb is subtracted from the power target input signal $P_L^*$ in a node 10 to form a power line error signal PL_ERR. The power line error signal PL_ERR is used as an input for a grid power regulation stage 11, which in turn outputs a target power signal $P_G^*$ for the generator 1.

Similarly, the generator power feedback loop 7 receives stator voltage input $U_S^*$ and stator current input $i_S$, based on which a generator power signal $P_G$ is computed in a generator power computation stage 12. The generator power signal $P_G$ is filtered in a second low pass filter 13 to form the generator power feedback signal PG_fb. The generator power feedback signal PG_fb is subtracted from the generator power target value $P_G^*$ in a node 14 to form a generator power error signal PG_ERR. The generator power error signal PG_ERR is used as an input for the power generator control stages 15, 16, 17, which, in turn, deliver an output signal 18.

Together with additional inputs, such as information derived from a tacho as an encoder/counter signal ENC_CNT, the output signal 18 of the generator power control stages is used as input to a stator flux/current control device 19, which, via a Pulse Width Modulator stage 20, controls the AC/DC converter 3 in order to obtain the desired operation of the wind turbine generator system.

For the overall wind turbine generator control purposes, further signals such as generator stator temperature Temp_G, speed $\omega_m$ and acceleration $a_m$ of the rotating mechanical parts are provided. The speed $\omega_m$ and the acceleration $a_m$ may readily be calculated as first and second derived, respectively, of the position information provided by the encoder/counter signal ENC_CNT from the tacho. The measurement of the stator temperature Temp_G is performed in a temperature measuring stage 21 using one or more sensors in the stator of the generator.

The inventors have realized that utilizing this information already readily available in the control system allows an implementation of a diagnostic monitoring the control system at very little expense as these already available signals suffice for a diagnose of the system, in turn, allowing early warning about inter alia developing faults.

Figure 2A:
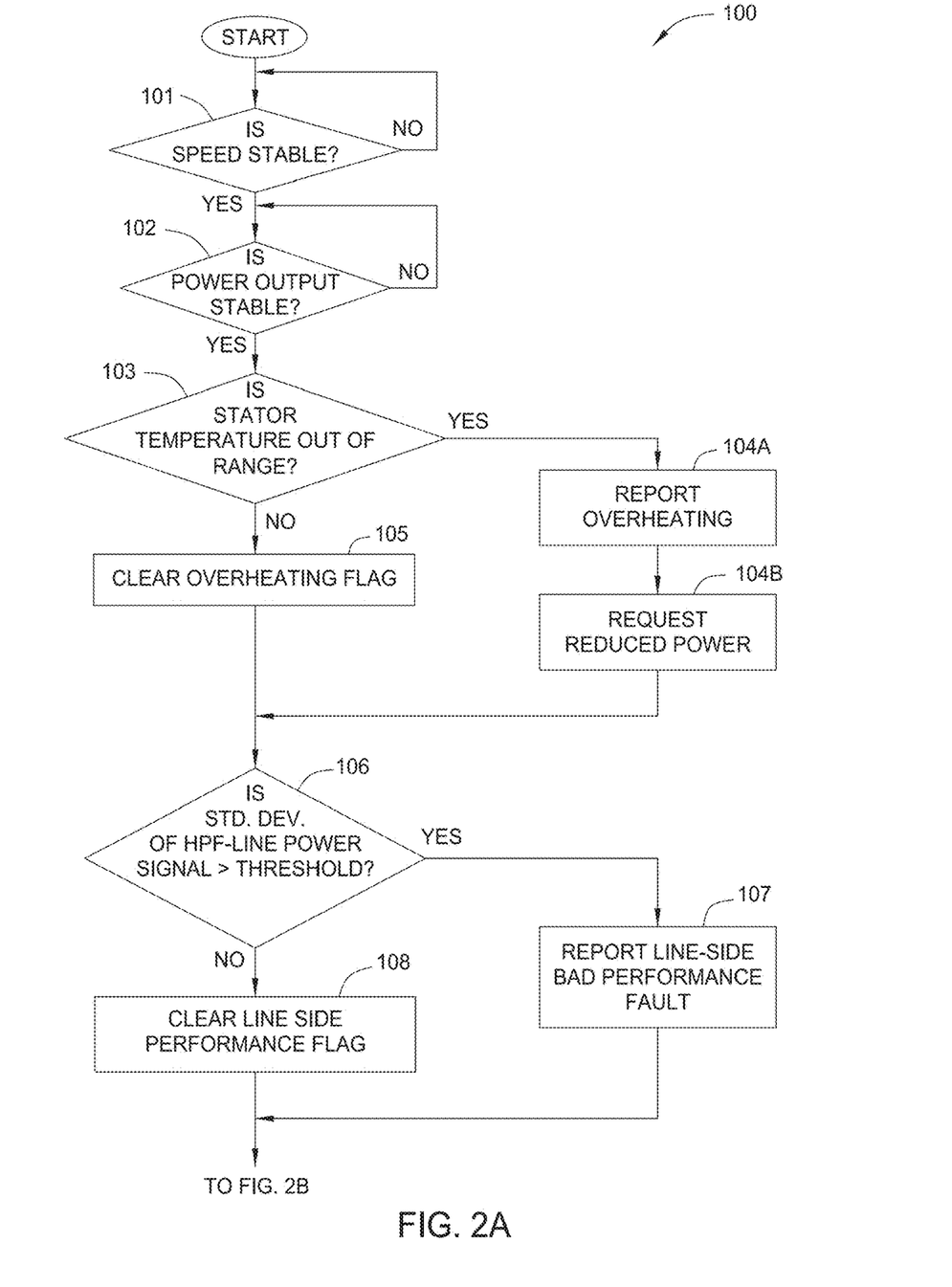
FIGS. 2A-2C illustrate a flow chart of a diagnostic monitoring according to the invention.
Figure 2B:
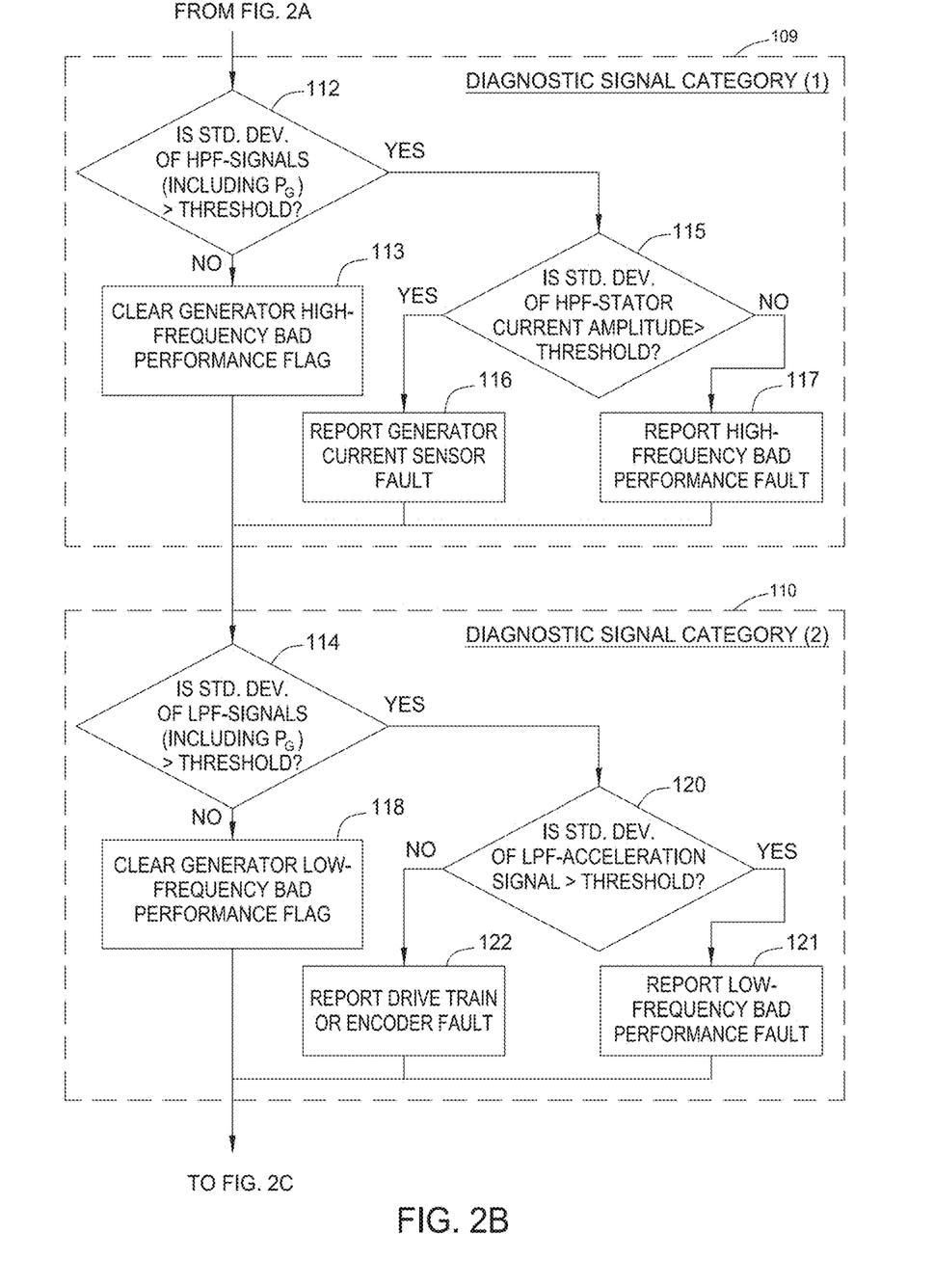
Figure 2C:
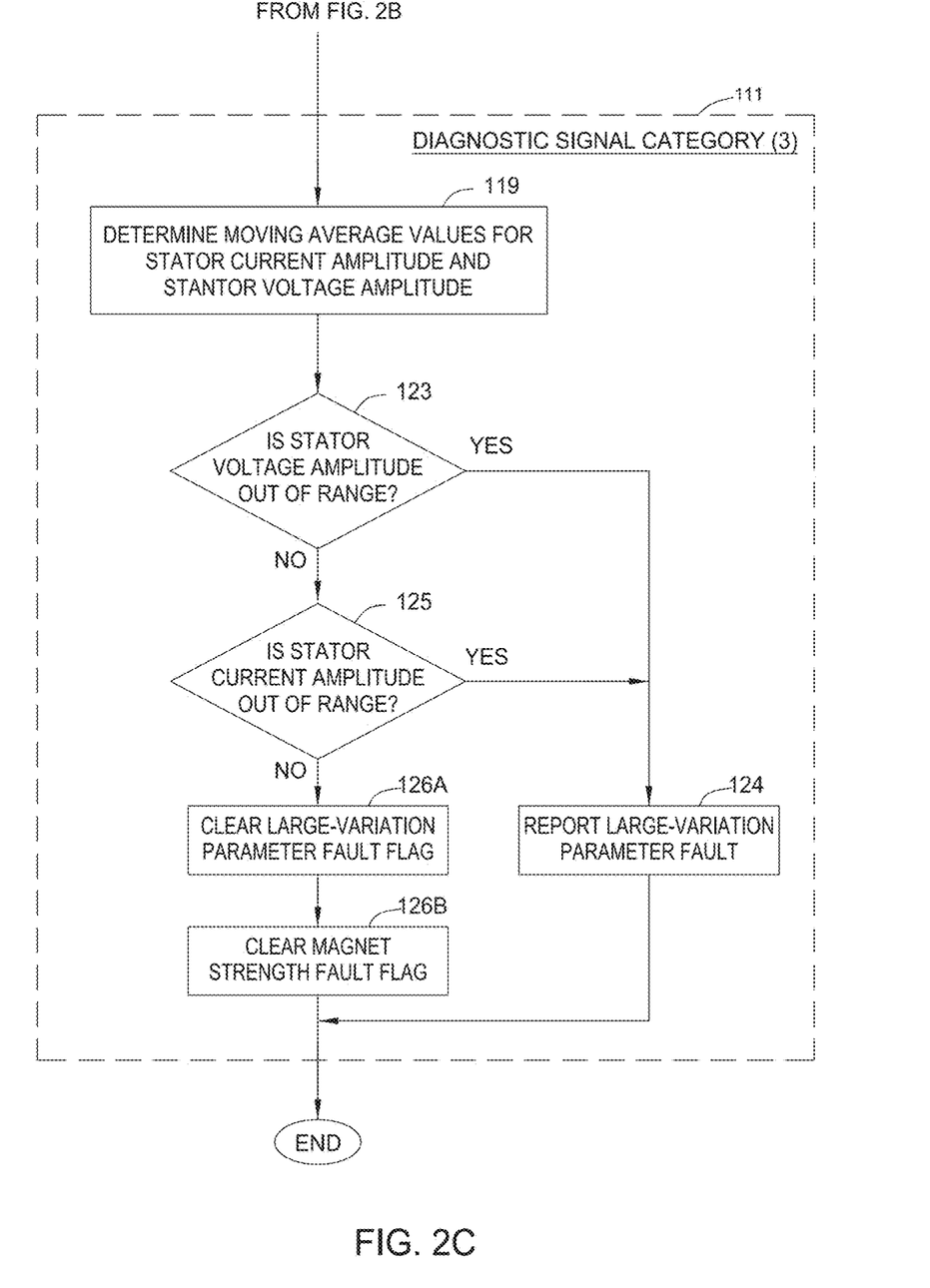

FIGS. 2A-2C illustrate a flow chart of such a diagnostic monitoring system, which may be implemented in the wind turbine generator control system and perform the diagnostic whenever the wind turbine generator is in a steady state.

The diagnostic method 100 begins at box 101, where a first waiting loop is performed until the speed of the system is stable. Then in box 102 a second waiting loop is performed until the power output of the system is stable. With both speed and power output being stable, the system is assumed to be in steady state, and in box 103 it is then checked that the stator is not overheating by checking that the stator temperature is not out of range. If the stator temperature too is high, then, in box 104A, the overheating is reported and in box 104B a request to reduce the power of the generator is sent to the wind turbine generator control system. Otherwise a corresponding overheating flag cleared in box 105. In either case the method proceeds to check, in box 106, whether the standard deviation of a high pass filtered line power signal exceeds a certain threshold level. If this is the case a bad performance fault on the line side is reported. Identifying such an external fault on the power line reduces the risk that the fault on the power line induces a false positive on the actual diagnostic of the wind turbine generator system, which it is the very purpose of the invention to perform. If no line side bad performance is detected, a corresponding flag is cleared in box 108. In either case the method 100 proceeds to do the actual diagnostic of the wind turbine generator system as illustrated in FIGS. 2B and 2C. The diagnostic is performed by analyzing three sets of data already in the control system in different ways so as to categorize the result and identify different fault types. The three categories, diagnostic signal category (1), diagnostic signal category (2), and diagnostic signal category (3) are outlined in the boxes 109, 110 and 111, respectively.

First, in box 112, it is determined whether the standard deviation of high pass filtered signals including the generator power signal $P_G$ exceeds a threshold level. If this is not the case, a generator high frequency bad performance flag is cleared in box 113, and the method proceeds to the next test in box 114. If, on the other hand, the standard deviation of high pass filtered signals including the generator power signal $P_G$ exceeds a threshold, it is, in box 115, additionally tested whether the standard deviation of high pass filtered stator current amplitude $|I_S|$ exceeds a threshold value. If that is also the case, it is likely that the fault is in the current sensor, and a generator current sensor fault is reported in box 116 and the method proceeds to box 114. If, on the other hand, the standard deviation of high pass filtered stator current amplitude $|I_S|$ does not exceed the threshold value, the fault is likely to be a high frequency bad performance fault, such as e.g. a worn or broken generator bearing, and this is reported in box 117. The fault could, however, also be a bad encoder/counter signal ENC_CNT, but in either case a fault report is relevant, and either can be checked in due cause, e.g. at next scheduled maintenance. Having diagnosed and reporting a fault in box 117 the method proceeds to box 114, for the test in the next category.

Then, in box 114, it is determined whether the standard deviation of low pass filtered signals including the generator power signal $P_G$ exceeds a threshold level. If this is not the case, a generator low frequency bad performance flag is cleared in box 118, and the method proceeds to the next test in box 119. If, on the other hand, the standard deviation of low pass filtered signals including the generator power signal $P_G$, exceeds a threshold, it is in box 120 additionally tested whether the standard deviation of low pass filtered acceleration signal $a_m$ exceeds a threshold value. If that is also the case it is likely that the fault is a low frequency bad performance fault, and a low frequency bad performance fault is reported in box 121 and the method proceeds to box 119. If on the other hand, the standard deviation of low pass filtered acceleration signal $a_m$ does not exceed the threshold value, the fault is likely to be a drive train fault, e.g. a worn or broken gear tooth, and this is reported in box 122. The fault could, however, also be a bad encoder/counter signal ENC_CNT, but in either case a fault report is relevant, and either can be checked in due cause, e.g. at next scheduled maintenance. Having diagnosed and reporting a fault in box 122 the method proceeds to box 119, for the test in the third category.

Finally, in box 119 moving average values for stator current amplitude $|I_S|$ and stator voltage amplitude $|U_S|$. It is then in box 123 checked whether the stator voltage $|U_S|$ is out of the desired working range. If this is the case, a possible large variation parameter fault of the generator is reported in box 124, and the diagnostic method can be repeated from box 100. If it is not the case, then it is in box 125 checked whether the stator current amplitude is outside of the desired working range. If this is the case, a possible large variation parameter fault of the generator is also reported in box 124, and the diagnostic method can be repeated from box 100. If it is not the case, the appropriate flags for possible parameter change fault and magnet strength fault can be cleared in respective boxes 126A, 126B. The diagnostic method 100 ends following completion of box 124 or box 126B.

Figure 3:
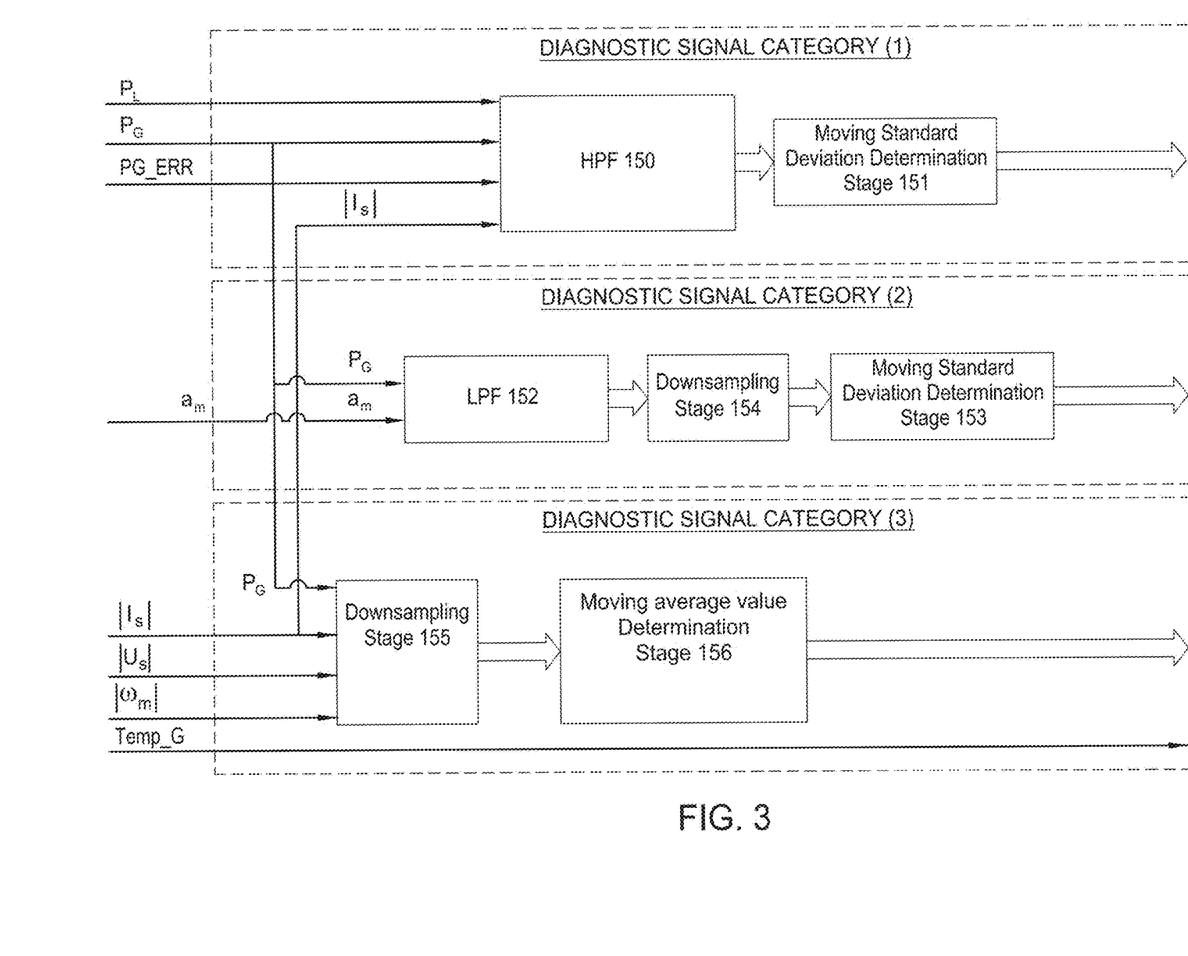
FIG. 3 is a block diagram showing input and output for the signal computation of the diagnostic monitoring of the invention.

As will be understood from the above, the invention effectively uses signals already available in the control system to detect minor faults and by the use of appropriate filtering sorts these faults into three categories allowing discrimination between probable causes for the faults. FIG. 3 yields more details on a preferred embodiment of how this is done. More specifically, the block diagram of FIG. 3 shows input and output for the signal computation of the diagnostic monitoring of the invention.

As can be seen, the inputs for the identification of a possible error in signal category (1) are the line power signal $P_L$ the generator power signal $P_G$, the generator power error signal PG_ERR and the stator current amplitude signal $|I_S|$. In box 150 of the block diagram, these signals are first high pass filtered having a cut off frequency yielding signals above approximately 1.2 times the generator electrical frequency. Then, in box 151, a moving standard deviation is computed based on the filtered signals. The result of this computation forms the basis for the decision in box 112 of FIG. 2.

The generator power signal $P_G$ is also used as the input for the identification of a possible error in signal category (2) together with acceleration signal $a_m$, computed as can be seen from FIG. 1 from the encoder/counter signal ENC_CNT, serving as input to a position measurement stage 22 yielding inter alia as an output a rotational speed signal $\omega_m$ which is low pass filtered in a low pass filter 23 before serving basis for the computation of the acceleration $a_m$ in the acceleration computation stage 24. This computation is readily done, as it is well known that speed is the first derived of the position and acceleration is the first derived of the speed, i.e. the second derived of the position. Returning now to FIG. 3, in box 152 the generator power signal $P_G$ and the acceleration signal $a_m$ are filtered in a low pass filter having a suitable cut-off frequency, e.g. about 5 to 10 Hz, thus yielding signals below 5 to 10 Hz. Like for the signals in category (1), a moving standard deviation is computed, in box 153, based on the filtered signals. The result of this computation forms the basis for the decision in boxes 113 and 115 of FIG. 2. However, in order to get and keep valid data for the slower dynamic performance information, as compared to that of category (1), it is preferred to down sample the data so as to reduce the amount of data to be stored. This down sampling which is preferably to a frequency of approximately 100 Hz is done in box 154 of FIG. 3.

As inputs for the identification of a possible error signal in category (3), the generator power signal $P_G$ and the stator current amplitude signal $|I_S|$ are also both used, as well as the speed signal $\omega_m$, computed as described above from the encoder/counter signal ENC_CNT, and the stator voltage amplitude $|U_S|$. In category (3) the signals are first down sampled to a frequency e.g. below 10 Hz in box 155 of FIG. 3. Again, this is to reduce the amount of data to be stored and handled. The reduced sample frequency here can be quite low because in category (3) the aim is to look for long term changes. This is done by performing, in box 156, a moving average mean value computation, which in terms of filtering can be regarded as analogous to filtering out the DC level, i.e. identifying global changes. The output of this moving average mean value computation inter alia serves to obtain the correct reference in box 119 of FIG. 2 and subsequent decisions on possible faults, i.e. variation faults, such as short circuited windings or deterioration of magnet strength, in boxes 124 and 125. In this the values of $|I_S|$ and $|U_S|$ are compared to reference values to determine a deviation value, and this deviation value is matched up against a predetermined value to determine the variation fault.

Though, in the above description of the conditioning and evaluation of the sets of signals is performed in a specific order, i.e. first category (1), then category (2) and finally category (3), the skilled person will realize that the order is not important. If desired and if sufficient computing power is available, that the conditioning and evaluation of the sets of signals, may even be performed in parallel.

As to obtaining the correct reference, a good reference including information about operation conditions is necessary in order to ensure that a correct comparison is made, since long term changes are to be identified. Here, the generator power signal $P_G$ and the speed signal $\omega_m$ serve as operation condition signals to ensure that the stator current amplitude signal $|I_S|$ and the stator voltage amplitude $|U_S|$ are compared with the correct references, i.e. references corresponding to the same operating conditions.

Obtaining these references is preferably performed in one of two ways, as will be explained in greater detail below. One way is by establishing a look-up table, another is by emulation of the generator system, e.g. in software.

Figure 4:
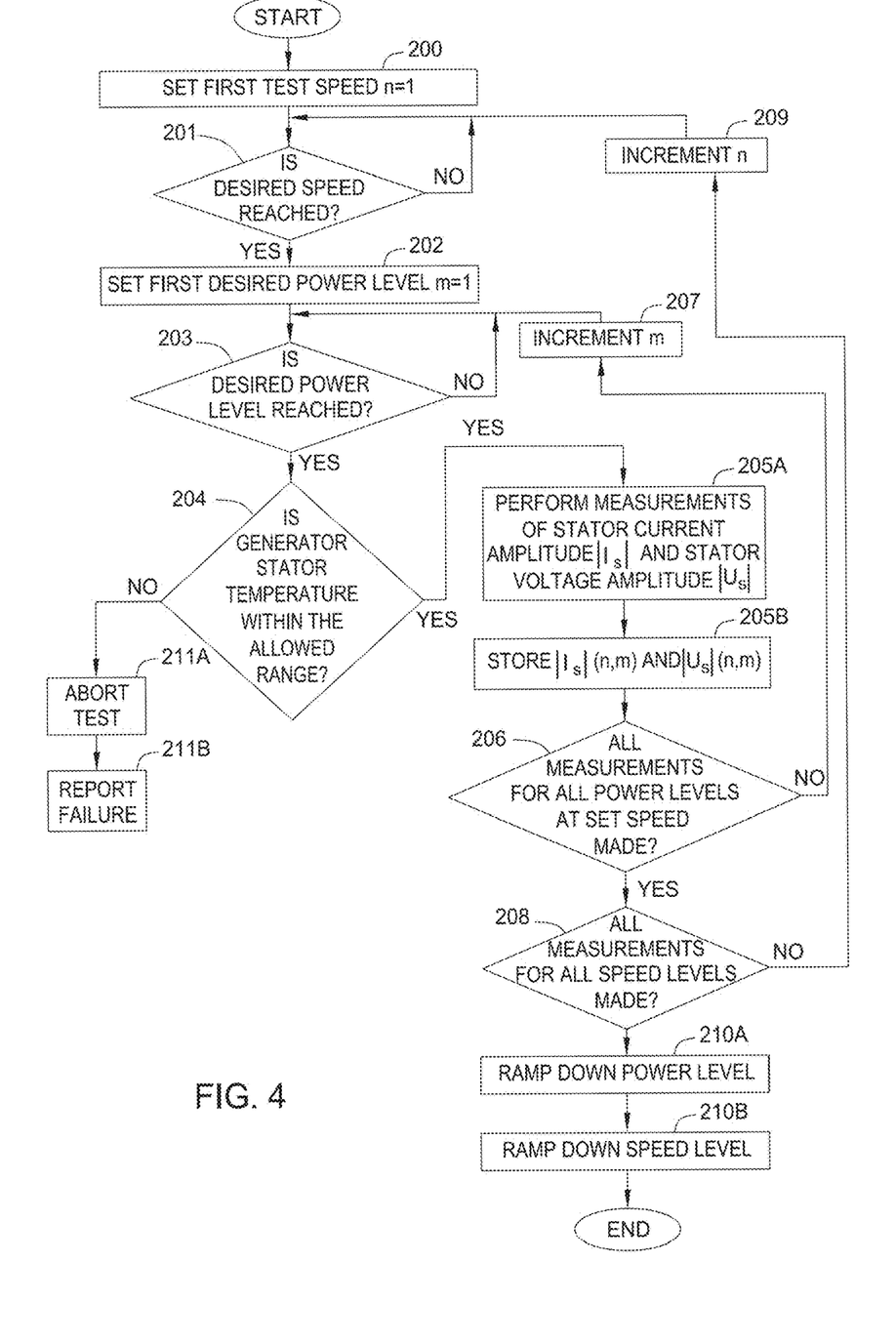
FIG. 4 is a flow chart of a measuring procedure for establishing a look-up table for the use in the present invention.

FIG. 4 is a flow chart of a measuring procedure for establishing a look-up table for values of stator current amplitude $|I_S(n,m)|$ and values of stator voltage amplitude $|U_S(n,m)|$, where n is a given speed and m is a given power level. This measuring procedure may be part of a commissioning test or it may be included as one test among other commissioning tests.

The test starts with the setting of a first test speed n=1 in box 200. The test then waits in a first waiting loop around box 201, until the desired speed has been reached. Then the first desired power level m=1 is set in box 202, and the test waits in a second waiting loop around box 203 until the desired power level has been reached. In box 204 it is checked whether the generator stator temperature is within allowed range, if not the test is aborted in box 211A and a test failure reported in box 211B.

If, on the other hand, the generator stator temperature is within the allowed range, the measurements are performed in box 205A and the stator current amplitude $|I_S|(1,1)$ and stator voltage amplitude $|U_S|(1,1)$ are stored in box 205B. Additional values, such as the generator stator temperature Temp_G, may of course also be stored. In box 206 it is checked whether measurements for all power levels at the first set speed have been made. If not, m is incremented to the next power level in box 207, e.g. m=2 and the measurements repeated from box 203, until all the values of the generator power level have been tested at this speed, i.e. until m=M and the answer in box 206 becomes yes.

Then, in box 208, it is checked whether all speed levels have been checked. If not, the speed level is incremented to the next level, e.g. n=2 in box 209, and the measurements for next speed level and all power levels 1 to M repeated until measurements for all speed levels and power levels have been performed, i.e. n=N and m=M, and the answer in box 208 becomes yes. Then in boxes 210A, 210B the power level and speed levels are respectively ramped down and the test ends.

The stored values then reflect the condition of the generator as it was at commissioning, and these values may be used in the diagnostic monitoring according to the present invention to see if or how the generator changes over time.

Performing such a measuring program at the commissioning of the wind turbine generator system may, however, be impractical from a time consumption point of view. However, with a suitable generator model and knowing essential data such as generator model parameters, sampling rate, reference signals, input signals like position feedback and speed feedback, the performance of the generator in the control system may be emulated. Thus, as another preferred embodiment, the invention utilizes an emulation obviating the need of elaborate measurements. This, however, necessitates additional computing power, and the choice of which embodiment is the most preferred is likely to be a tradeoff between the costs and availability of computer power, and the costs and availability of time for the measurements in the commissioning tests.

Figure 5:
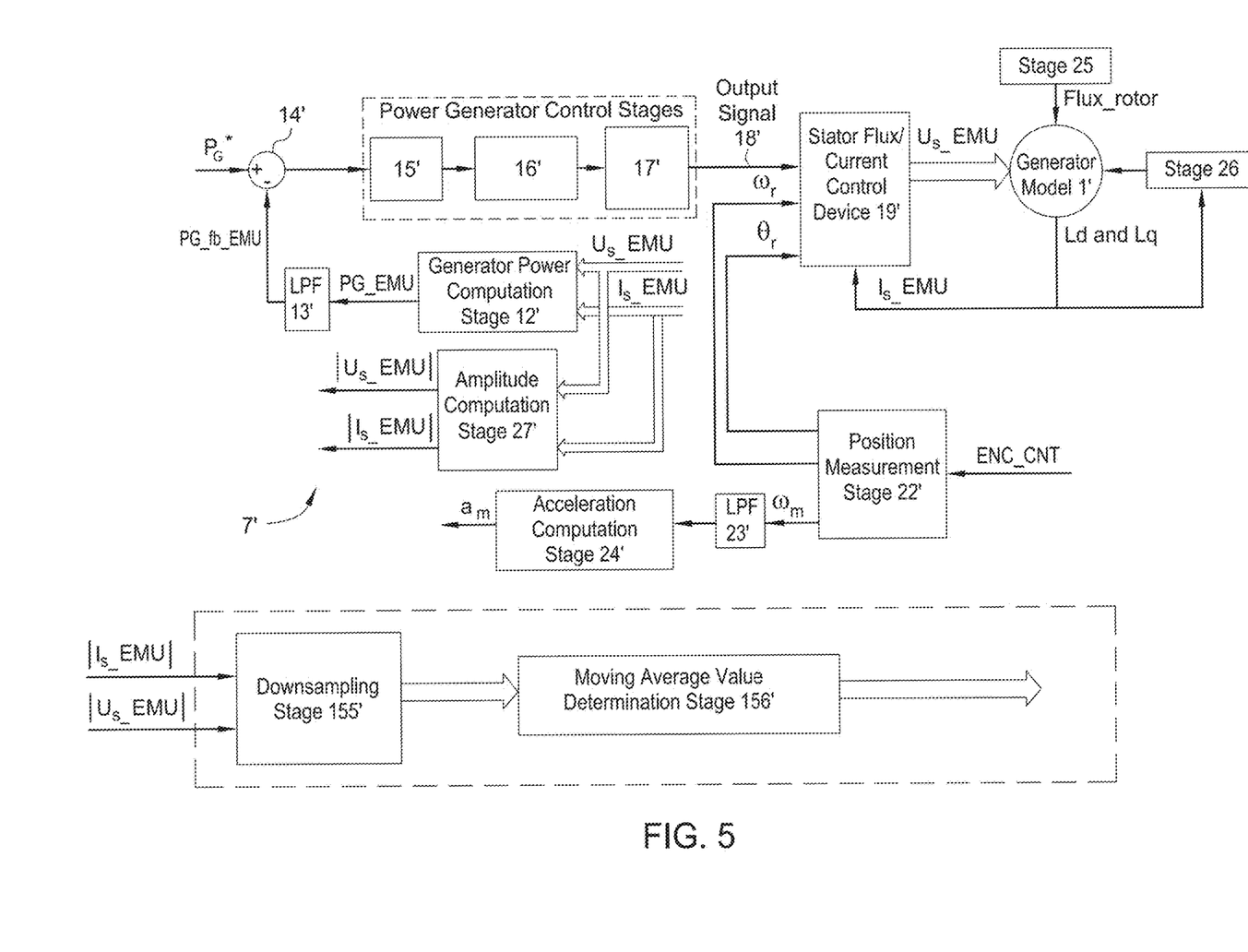
FIG. 5 is a block diagram showing a generator emulating system for the use in the present invention.

FIG. 5 exemplifies a generator control model for emulating the actual generator control on a real time basis in order to supply emulated stator current amplitude signal $|I_S\_EMU|$ and the stator voltage amplitude $|U_S\_EMU|$ in box 119 of FIG. 2, which may be used as reference values in the boxes 123 and 125 instead of the tabulated values explained above.

Evidently, since the model is to emulate the wind turbine generator control system of FIG. 1, the signals, stages and other parts of FIG. 5 are largely similar thereto. For ease of reading, corresponding parts use the same reference numerals but provided with primes when emulated, corresponding emulated signals are named using the extension _EMU, as indicated in the preceding paragraph, and for the actual signals identical to the wind turbine control system of FIG. 1 the same names are used.

As can be seen, the generator power feedback loop 7' receives an emulated stator voltage input $U_S\_EMU^*$ and an emulated stator current input $I_S\_EMU$. The emulated stator voltage input $U_S\_EMU^*$ and the emulated stator current input $I_S\_EMU$ receive the same treatment as the actual signals $\overline{U}_S^*$ and $i_S$ would in the actual control system. As opposed to the actual control system, the emulated system uses a generator model 1' instead of the actual generator 1. If as suggested above, the generator is an IPM machine, the generator parameters, which should be modeled by the generator model would be:

Ld—stator D axis inductance
Lq—stator Q axis inductance
Rs—stator resistance
Flux_r—Rotor flux
Ir—rated current
Pr—rated power
PP—pole pair
Sr—rated speed Thus, based on the emulated stator voltage input $U_S\_EMU^*$ and the emulated stator current input $I_S\_EMU$ an emulated generator power signal $P_G\_EMU$ is computed in a generator power computation stage 12'. The emulated generator power signal $P_G\_EMU$ is filtered in a low pass filter 13' to form the emulated generator power feedback signal PG_fb_EMU. The generator power feedback signal PG_fb_EMU is subtracted from the generator power target value $P_G^*$ in a node 14' to form a generator power error signal PG_ERR_EMU. The generator power error signal PG_ERR_EMU is used as an input for the power generator control stages 15', 16', 17', which, in turn, deliver an output signal 18'.

Together with actual information derived from the tacho as the encoder/counter signal ENC_CNT, the output signal 18' of the generator power control stages are used to emulate the input to a stator flux/current control device 19', which delivers the input the generator model 1', which utilizes the parameters above, in order to serve as proper basis for the generator model 1' in the emulation in order to emulate the desired operation of the wind turbine generator system. The generator model 1' further receives real values regarding the rotor flux amplitude in stage 25 and real values about the inductance value in stage 26.

For the overall wind turbine generator control purposes, further signals such as generator stator temperature Temp_G, speed $\omega_m$ and acceleration $a_m$ of the rotating mechanical parts are provided. These real signals are used as an input for the emulation and the diagnostic method. As already mentioned, the speed $\omega_m$ and the acceleration $a_m$ may readily be calculated as first and second derived, respectively, of the position information provided by the encoder/counter signal ENC_CNT from the tacho, whereas the generator stator temperature Temp_G is measured in an appropriate manner in the stator of the generator.

Since the emulated stator voltage input $U_S\_EMU^*$ signal and the emulated stator current input signal $I_S\_EMU$ are treated in the same manner as the actual signals $U_S^*$ and $i_S$, the only difference being that the generator 1' is emulated. Hence, if the actual generator 1 differs from the generator model 1' the resulting values $U_S\_EMU^*$ and $I_S\_EMU$ in the emulation will differ from the actual signals $U_S^*$ and $i_S$. Since $U_S\_EMU^*$ and $I_S\_EMU$ are used for the computation of the emulated stator current amplitude $|I_S\_EMU|$ and the emulated stator voltage amplitude $|U_S\_EMU|$ in the amplitude computation stage 13' these values will also differ from the actual values and be suitable for the identification of faults after being subjected to down sampling 155' and computation of moving average mean value 156', as can be seen in the lower part of FIG. 5 corresponding the lower third of FIG. 3.

With the invention, an efficient diagnostic system is provided. The diagnostic system may be implemented directly in the software running on the data processing means of the wind turbine generator control system, e.g. as an integrated part of the control system software or as a separate piece of software running on the same data processing means or on separate data processing means. In either case, the software may be delivered on an appropriate data carrier, such as a disc or a data network. The skilled person will know that the diagnostic system outlined above is only an example and will identify numerous possible variations within the scope of the claims. In particular, the skilled person will realize that the diagnostic system may include further sensors and further sensor signals in the first, second and third sets of signals than those outlined above so as to increase the range of faults that may be detected and identified.

The invention claimed is:

1. A method for diagnostic monitoring of a wind turbine generator system comprising a generator, a drive train, and a plurality of sensors coupled with the generator and drive train and providing sensor signals to a generator control system during operation of the wind turbine generator system, the method comprising:
generating, using a processor of the generator control system, a predetermined set of diagnostic signals comprising determined electrical characteristics of a stator of the generator;
determining moving average values for the predetermined set of diagnostic signals to produce a conditioned set of diagnostic signals; and
determining, using the processor and based on a comparison of the conditioned set of diagnostic signals with one or more predetermined reference values, an absence of a fault or a location of a fault within the wind turbine generator system.

2. The method according to claim 1, wherein the predetermined set of diagnostic signals further comprises high-frequency components from the sensor signals, wherein generating the predetermined set of diagnostic signals comprises high-pass filtering the sensor signals.

3. The method according to claim 2, wherein the sensor signals comprise a generator power signal and a stator current amplitude signal, wherein determining a location of a fault within the wind turbine generator system comprises one of:
reporting a high-frequency bad performance fault of the generator when a difference between a high-pass filtered generator power signal and a high-pass generator power reference value exceeds a first threshold level and a difference between a high-pass filtered stator current amplitude signal and a high-pass stator current amplitude reference value does not exceed a second threshold level, and
reporting a current sensor fault of the generator when the difference between the high-pass filtered generator power signal and the high-pass generator power reference value exceeds the first threshold level and the difference between the high-pass filtered stator current amplitude signal and the high-pass stator current amplitude reference value exceeds the second threshold level.

4. The method according to claim 1, wherein the predetermined set of diagnostic signals further comprises low-frequency components from the sensor signals, wherein generating the predetermined set of diagnostic signals comprises low-pass filtering the sensor signals.

5. The method according to claim 4, wherein the sensor signals comprise a generator power signal and an acceleration signal, wherein determining a location of a fault within the wind turbine generator system comprises one of:
reporting a low-frequency bad performance fault of the generator when a difference between a low-pass filtered generator power signal and a low-pass generator power reference value exceeds a first threshold level and a difference between a low-pass filtered acceleration signal and a low-pass acceleration reference value exceeds a second threshold level, and
reporting a drive train fault or encoder fault when the difference between the low-pass filtered generator power signal and the low-pass generator power reference value exceeds the first threshold level and the difference between the low-pass filtered acceleration signal and the low-pass acceleration reference value does not exceed the second threshold level.

6. The method according to claim 4, wherein generating the predetermined set of diagnostic signals further comprises:
downsampling the low-pass filtered sensor signals.

7. The method of claim 6, wherein the low-pass filtered sensor signals are downsampled to a frequency of approximately 100 Hz.

8. The method according to claim 1, wherein the predetermined set of diagnostic signals are selected to allow determining a fault in the generator.

9. The method according to claim 1, further comprising downsampling the moving average values for the conditioned set of diagnostic signals before the comparison with the one or more predetermined reference values.

10. The method according to claim 1, wherein the plurality of sensors provide multiple sets of sensor signals, and wherein each set of the multiple sets of sensor signals is evaluated separately in determining an absence of a fault or a location of a fault within the wind turbine generator system.

11. The method according to claim 1, wherein the one or more predetermined reference values are derived from commissioning tests and are stored in a look-up table.

12. The method according to claim 1, further comprising: receiving the one or more predetermined reference values from an emulation of at least a part of the wind turbine generation system.

13. The method according to claim 12, wherein the emulation comprises a real-time emulation of the generator control system.

14. The method according to claim 12, wherein the emulation comprises an emulation of the generator using same operating parameters as the generator.

15. The method according to claim 1, wherein determining an absence of a fault or a location of a fault is based on standard deviation values of the predetermined set of diagnostic signals with respect to the one or more predetermined reference values.

16. The method of claim 1, wherein the predetermined set of diagnostic signals comprises (1) high-frequency components from the sensor signals, (2) low-frequency components from the sensor signals, and (3) the determined electrical characteristics of the stator of the generator.

17. The method of claim 1, wherein the predetermined reference values include a first frequency threshold that is approximately 1.2 times an electrical frequency of the generator, and a second frequency threshold is between about 5 hertz (Hz) and about 10 Hz.

18. A computer program product comprising a non-transitory computer-readable storage medium containing code which, when executed by one or more processors, performs an operation for diagnostic monitoring of a wind turbine generator system, the wind turbine generator system comprising a generator, a drive train, and a plurality of sensors coupled with the generator and drive train and providing sensor signals to a generator control system during operation of the wind turbine generator system, the operation comprising:
  generating, using the sensor signals, a predetermined set of diagnostic signals comprising determined electrical characteristics of a stator of the generator;
  determining moving average values for the predetermined set of diagnostic signals to produce a conditioned set of diagnostic signals; and
  determining, based on a comparison of the conditioned set of diagnostic signals with one or more predetermined reference values, an absence of a fault or a location of a fault within the wind turbine generator system.

19. A system, comprising:
  a wind turbine comprising a generator, a drive train, a plurality of sensors coupled with the generator and drive train and producing sensor signals; and
  a generator control system configured to receive the sensor signals and comprising a processor configured to perform an operation comprising:
    generating, using the sensor signals, a predetermined set of diagnostic signals comprising determined electrical characteristics of a stator of the generator;
    determining moving average values for the predetermined set of diagnostic signals to produce a conditioned set of diagnostic signals; and
    determining, based on a comparison of the conditioned set of diagnostic signals with one or more predetermined reference values, an absence of a fault or a location of a fault within the wind turbine.

20. A method for diagnostic monitoring of a wind turbine generator system comprising a generator, a drive train, and a plurality of sensors coupled with the generator and drive train and providing sensor signals to a generator control system during operation of the wind turbine generator system, the method comprising:
  generating, using a processor of the generator control system, a predetermined set of diagnostic signals comprising at least one of:
    (1) high-frequency components from the sensor signals having frequencies greater than a predetermined first frequency threshold, and
    (2) low-frequency components from the sensor signals having frequencies less than a predetermined second frequency threshold, the second frequency threshold being less than the first frequency threshold; and
  determining, using the processor and based on a comparison of the predetermined set of diagnostic signals with one or more predetermined reference values, an absence of a fault or a location of a fault within the wind turbine generator system,
  wherein determining an absence of a fault or a location of a fault is based on standard deviation values of the predetermined set of diagnostic signals with respect to the one or more predetermined reference values.

\* \* \* \* \*